United States Patent
Takenaka et al.

(10) Patent No.: US 8,510,021 B2
(45) Date of Patent: Aug. 13, 2013

(54) VEHICLE CONTROL SYSTEM

(75) Inventors: Kenji Takenaka, Kobe (JP); Hirohide Matsushima, Kobe (JP); Osamu Tani, Kobe (JP); Tomomichi Nose, Kobe (JP); Masahiro Yamaguchi, Taishi-cho (JP)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 325 days.

(21) Appl. No.: 12/954,023

(22) Filed: Nov. 24, 2010

(65) Prior Publication Data
US 2011/0130932 A1 Jun. 2, 2011

(30) Foreign Application Priority Data

Nov. 30, 2009 (JP) ................................. 2009-272210

(51) Int. Cl.
*F16H 63/50* (2006.01)
*F16H 61/02* (2006.01)

(52) U.S. Cl.
USPC .......................................... 701/110; 701/54

(58) Field of Classification Search
None
See application file for complete search history.

(56) References Cited

U.S. PATENT DOCUMENTS

| 6,564,136 B2 * | 5/2003 | Asumi et al. ..................... 701/70 |
| 7,171,299 B1 * | 1/2007 | Stroh ............................ 701/110 |
| 7,386,381 B2 * | 6/2008 | Matsushima et al. ........... 701/51 |
| 2008/0182716 A1 * | 7/2008 | Sato et al. ..................... 477/110 |

FOREIGN PATENT DOCUMENTS

| JP | 2005-321088 A | 11/2005 |
| JP | 2007016886 A | 1/2007 |
| JP | 2009-107406 | * 5/2009 |

* cited by examiner

*Primary Examiner* — Michael J Zanelli
(74) *Attorney, Agent, or Firm* — Alleman Hall McCoy Russell & Tuttle LLP

(57) ABSTRACT

A vehicle control system includes a determiner configured to determine whether or not a driver has performed a predetermined acceleration or deceleration operation; a detector configured to detect a value of at least one of a relative rotational position and relative rotational speed of an input shaft and an output shaft, the input shaft being positioned upstream of an engagement portion of driving power transmission members which are engaged with each other with a slack on a driving power transmission path, and the output shaft being positioned downstream of the engagement portion, and a controller configured to execute control for accelerating or decelerating the input shaft or the output shaft to reduce at least one of a contact speed and transmission torque of the driving power transmission members based on the value detected by the detector, if the determiner determines that the driver has performed the acceleration or deceleration operation.

10 Claims, 12 Drawing Sheets

VEHICLE CONTROL SYSTEM

CROSS-REFERENCE TO RELATED APPLICATION

The present application claims priority from Japanese Patent Application No. 2009-272210, entitled "Vehicle Control System" filed on Nov. 30, 2009, which is hereby incorporated by reference in its entirety for all purposes.

FIELD OF THE INVENTION

The present invention relates to a control system in a vehicle including driving power transmission members engaged with each other with a slack on a driving power transmission path through which a driving power is transmitted from a driving power source to a drive wheel.

DESCRIPTION OF THE RELATED ART

A vehicle such as a motorcycle includes various driving power transmission members such as gears, a dog clutch, a chain, sprockets, and splines on a driving power transmission path from an engine to a drive wheel. These driving power transmission members are engaged with their adjacent driving power transmission members with a slack on the driving power transmission path. In such a vehicle, there is a rotational speed difference between the driving power transmission members located at an upstream side and the driving power transmission members located at a downstream side on the driving power transmission path, due to an increase or decrease in an engine speed, an engine braking operation, and the like. These driving power transmission members are disengaged from each other for a moment and contact each other again at their opposite surfaces. In this case, if a contact speed or a transmission torque is high, an impact is generated and transmitted to a driver, which makes the driver's driving feel worse. To solve this, a technique has been proposed, in which an input shaft and/or an output shaft is/are accelerated and decelerated based on a relative rotational position and/or a relative rotational speed of the input shaft and/or the output shaft on the driving power transmission path (e.g., see Japanese Laid-Open Patent Application Publication No. 2005-321088). This technique makes it possible to reduce the contact speed and/or transmission torque which occurs when adjacent driving power transmission members are relatively displaced and contact each other again within a range of a slack on the driving power transmission path from the engine to the drive wheel. In this way, the impact due to the contact between the driving power transmission members can be mitigated.

In a case where a load applied from a ground surface to a drive wheel increases for a moment, a relative rotational speed is generated at an input shaft and an output shaft. For example, in a case where the vehicle is driving off-road, the load applied from the ground surface to the drive wheel repetitively fluctuates, periodically generating the relative rotational speed at the input shaft and the output shaft. If acceleration or deceleration control for mitigating the impact due to the contact is executed every time the relative rotational speed is generated, acceleration or deceleration occurs for a short time frequently, making the driver feel discomfort. As a result, drivability is reduced.

SUMMARY OF THE INVENTION

The present invention addresses the above described condition, and an object of the present invention is to lessen driver's driving discomfort and improve drivability.

According to the present invention, there is provided a vehicle control system in a vehicle including driving power transmission members which are engaged with each other with a slack on a driving power transmission path through which a driving power is transmitted from a driving power source to a drive wheel, the vehicle control system comprising: an acceleration and deceleration determiner configured to determine whether or not a driver has performed a predetermined acceleration or deceleration operation; a driving power transmission state detector configured to detect a value of at least one of a relative rotational position and a relative rotational speed of an input shaft and an output shaft provided on the driving power transmission path, the input shaft being positioned upstream of engagement portions of the driving power transmission members which are engaged with each other with a slack on the driving power transmission path, and the output shaft being positioned downstream of the engagement portions on the driving power transmission path; and an acceleration and deceleration controller configured to execute acceleration or deceleration control for accelerating or decelerating the input shaft or the output shaft to reduce at least one of a contact speed and a transmission torque of the driving power transmission members based on the value detected by the driving power transmission state detector, if the acceleration and deceleration determiner determines that the driver has performed the acceleration or deceleration operation.

In accordance with such a configuration, since the input shaft or the output shaft is accelerated or decelerated to reduce the contact speed and/or transmission torque of the driving power transmission members in the acceleration or deceleration operation in which a great impact is generated due to a collision between the driving power transmission members, the impact transmitted to the driver can be mitigated. In addition, it is possible to avoid an event that the acceleration or deceleration control is executed every time a relative rotational speed is generated at the input shaft and the output shaft, which will frequently cause acceleration or deceleration to occur for a short time. This reduces the driver's discomfort. As a result, drivability is improved.

The vehicle control system may further comprise a throttle valve opening degree sensor configured to detect an opening degree of a throttle valve for controlling an amount of air supplied to an engine which is the driving power source; and the acceleration and deceleration determiner may be configured to determine whether or not the driver has performed the predetermined acceleration or deceleration operation, based on the throttle valve opening degree detected by the throttle valve opening degree sensor. Or, the vehicle control system may further comprise an air-intake pressure sensor configured to detect an air-intake pressure of an engine which is the driving power source; and the acceleration and deceleration determiner may be configured to determine whether or not the driver has performed the predetermined acceleration or deceleration operation, based on the air-intake pressure detected by the air-intake pressure sensor. Thus, the acceleration or deceleration operation is easily detected using the existing devices.

The acceleration and deceleration determiner may be configured to determine that a transient operation in which a change amount in an operation performed by the driver to transition the driving power source from a decelerated state to an accelerated state or from the accelerated state to the decelerated state, is larger than a predetermined value and is the predetermined acceleration or deceleration operation.

When the vehicle is transitioning from decelerated driving to accelerated driving or from accelerated driving to decelerated driving in a state where driving power transmission members are engaged with each other with a slack, the driving power transmission member provided at an input side moves away from one surface of the driving transmission member at an output side and collides against an opposite surface of the driving transmission member at the output side. When this movement occurs, a relative movement distance between the driving power transmission members is at a maximum and their relative speed becomes high, so that a great impact will be generated due to the collision between the driving power transmission members and make the driver's driving feel become worse. To solve this, in the above configuration, the input shaft or the output shaft is accelerated or decelerated to reduce at least one of the contact speed and transmission torque of the driving power transmission members when the movement is occurring. Therefore, it is possible to improve the driver's driving feel while preventing the acceleration or deceleration control from being executed frequently.

The vehicle control system may further comprise a throttle valve opening degree sensor configured to detect an opening degree of a throttle valve for controlling an amount of air supplied to an engine which is the driving power source, and the acceleration and deceleration determiner may be configured to determine that the driver has performed the transient operation for transitioning the driving power source from the decelerated state to the accelerated state if a difference of the throttle valve opening degree detected by the throttle valve opening degree sensor is larger than a difference threshold which is a predetermined positive value and the throttle valve opening degree is larger than a predetermined opening degree threshold.

In accordance with such a configuration, it is possible to determine when the vehicle is transitioning from decelerated driving to accelerated driving and a great impact is generated between the driving power transmission members, with a simple configuration.

The vehicle control system may further comprise: a throttle valve opening degree sensor configured to detect an opening degree of a throttle valve for controlling an amount of air supplied to an engine which is the driving power source; and the acceleration and deceleration determiner may be configured to determine that the driver has performed the transient operation for transitioning the driving power source from the accelerated state to the decelerated state if a difference of the throttle valve opening degree detected by the throttle valve opening degree sensor is smaller than a difference threshold which is a predetermined negative value and the throttle valve opening degree is smaller than a predetermined opening degree threshold.

In accordance with such a configuration, it is possible to determine when the vehicle is transitioning from accelerated driving to decelerated driving and a great impact is generated between the driving power transmission members, with a simple configuration.

The acceleration and deceleration controller may be configured to permit execution of the acceleration or deceleration control if an absolute value of the relative rotational speed detected by the driving power transmission state detector is larger than a predetermined speed threshold.

In accordance with such a configuration, since the acceleration or deceleration control is executed when the relative rotational speed is high and a great impact is likely to be generated between the driving power transmission members, it is possible to prevent the acceleration or deceleration control from being executed frequently while improving the driver's driving feel.

The acceleration and deceleration controller may be configured to start the acceleration or deceleration control at a time when an absolute value of the relative rotational position detected by the driving power transmission state detector exceeds a predetermined position threshold, if the acceleration and deceleration determiner determines that the driver has performed the predetermined acceleration or deceleration operation.

In accordance with such a configuration, since the acceleration or deceleration control will not start before the absolute value of the relative rotational position exceeds the predetermined position threshold, it is possible to start the acceleration or deceleration control just before the time when the driving power transmission members will collide and suitably prevent the acceleration or deceleration control from continuing for a long time unnecessarily.

The acceleration and deceleration controller may be configured to terminate the acceleration or deceleration control if the acceleration and deceleration determiner determines that the driver has not performed the predetermined acceleration or deceleration operation during the acceleration or deceleration control.

In accordance with such a configuration, it is possible to prevent the acceleration or deceleration control from continuing to be executed when a strong impact is not generated between the driving power transmission members. As a result, drivability is improved.

The vehicle control system may further comprise a throttle valve opening degree sensor configured to detect an opening degree of a throttle valve for controlling an amount of air supplied to an engine which is the driving power source; and the acceleration and deceleration controller may be configured to terminate the acceleration or deceleration control if an absolute value of a difference of the throttle valve opening degree detected by the throttle valve opening degree sensor is not more than a predetermined difference threshold during the acceleration or deceleration control.

In accordance with such a configuration, it is possible to inhibit the driving power source from being accelerated or decelerated excessively when a change in the acceleration or deceleration operation performed by the driver is less, improving the driver's driving feel.

The vehicle control system may further comprise an air-intake pressure sensor configured to detect an air-intake pressure of an engine which the driving power source, and the acceleration and deceleration controller may be configured to terminate the acceleration or deceleration control if an absolute value of a difference of the air-intake pressure detected by the air-intake pressure sensor is not more than a predetermined difference threshold during the acceleration or deceleration control.

In accordance with such a configuration, it is possible to inhibit the driving power source from being accelerated or decelerated excessively when a change in the acceleration or deceleration operation performed by the driver is less, improving the driver's driving feel.

The acceleration and deceleration controller may be configured to terminate the acceleration or deceleration control when a first predetermined time has lapsed from start of the acceleration or deceleration control.

In accordance with such a configuration, it is possible to prevent the acceleration or deceleration control from continuing for a long time unnecessarily, and to improve the driver's driving feel.

The acceleration and deceleration controller may be configured to inhibit the acceleration or deceleration control from being executed within a second predetermined time after termination of the acceleration or deceleration control.

In accordance with such a configuration, it is possible to prevent the acceleration or deceleration control from being executed repetitively and to improve the driver's driving feel.

The vehicle control system may further comprise a clutch disengagement determiner configured to determine whether or not a clutch provided on the driving power transmission path is disengaged; and the acceleration and deceleration controller may be configured to inhibit the acceleration or deceleration control from being executed if the clutch disengagement determiner determines that the clutch is disengaged.

In accordance with such a configuration, it is possible to prevent the acceleration or deceleration control from being executed unnecessarily in a state where the clutch is disengaged not to permit the driving power to be transmitted from the driving power source to the drive wheel. Therefore, it is possible to maintain a high driving capability when the clutch is returned from the disengaged state to an engaged state.

The vehicle control system may further comprise a braking operation determiner configured to determine whether or not a brake of the drive wheel is operating, and the acceleration and deceleration controller may be configured to inhibit the acceleration or deceleration control from being executed if the braking operation determiner determines that the brake is operating.

In accordance with such a configuration, it is possible to prevent the acceleration or deceleration control from being executed unnecessarily, when the drive wheel is being braked. Therefore, it is possible to maintain a high driving capability when the braking operation terminates.

The above and further objects, features and advantages of the invention will more fully be apparent from the following detailed description with reference to the accompanying drawings.

DETAILED DESCRIPTION OF THE PREFERRED EMBODIMENTS

Figure 1:
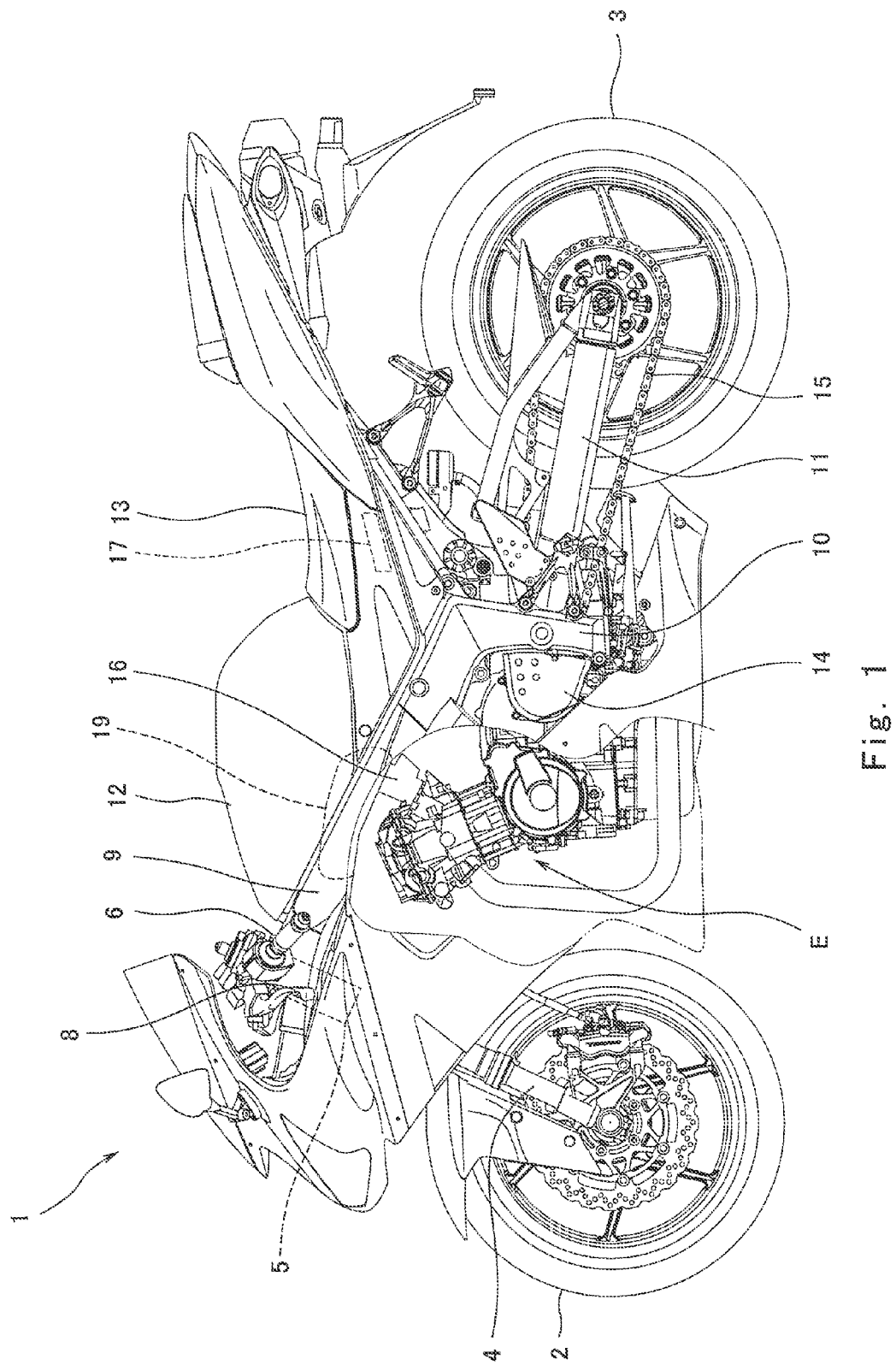
FIG. 1 is a left side view of a motorcycle according to Embodiment 1 of the present invention.

Hereinafter, embodiments of the present invention will be described with reference to the drawings. Throughout the drawings, the same or corresponding constituents are designated by the same reference characters, and will not be described repetitively. The stated directions are referenced from the perspective of a driver straddling a motorcycle, unless otherwise explicitly noted.

(Embodiment 1)

FIG. 1 is a left side view of a motorcycle 1 according to Embodiment 1 of the present invention. Referring to FIG. 1, the motorcycle 1 (vehicle) includes a front wheel 2 which is a driven wheel and a rear wheel 3 which is a drive wheel. The front wheel 2 is rotatably mounted to the lower end portion of a front fork 4 extending substantially vertically. The front fork 4 is attached to a steering shaft (not shown) via brackets. The steering shaft is rotatably supported by a head pipe 5. A bar-type steering handle 6 extending in a rightward and leftward direction is attached to the brackets. A throttle grip 7 (see FIG. 4) is provided at a portion of the steering handle 6 which is gripped by the driver's right hand. The throttle grip 7 is rotated by twisting the driver's wrist to operate a throttle device 16 as described later. A clutch lever 8 is provided in front of a grip provided at a portion of the steering handle 6 gripped by the driver's left hand.

A pair of right and left main frame members 9 extend rearward to be slightly tilted in a downward direction from the head pipe 5. A pair of right and left pivot frame members 10 are coupled to the rear portions of the main frame members 9, respectively. The front end portions of swing arms 11 extending substantially in the longitudinal direction of the motorcycle 1 are coupled to the pivot frame members 10, respectively such that each swing arm 11 is pivotable around the front end portion. The rear wheel 3 is rotatably mounted to the rear end portion of the swing arm 11. A fuel tank 12 is provided behind the steering handle 6. A seat 13 straddled by the driver is provided behind the fuel tank 12.

An engine E (driving power source) including a plurality of cylinders is mounted to the main frame members 9 and the pivot frame members 10, between the front wheel 2 and the rear wheel 3. A transmission 14 is coupled to the engine E. A driving power is transmitted from the transmission 14 to the rear wheel 3 via a chain 15. The throttle device 16 is disposed inward relative to the main frame members 9 and coupled to intake ports (not shown) of the engine E. An air cleaner 19 is disposed below the fuel tank 12 and coupled to the upstream portion of the throttle device 16 in an air flow direction. In an inner space below the seat 13, an ECU 17 (electronic control unit) configured to control the throttle device 16, an ignition device 48 (see FIG. 4), an injector 47 (see FIG. 4), etc is accommodated.

Figure 2:
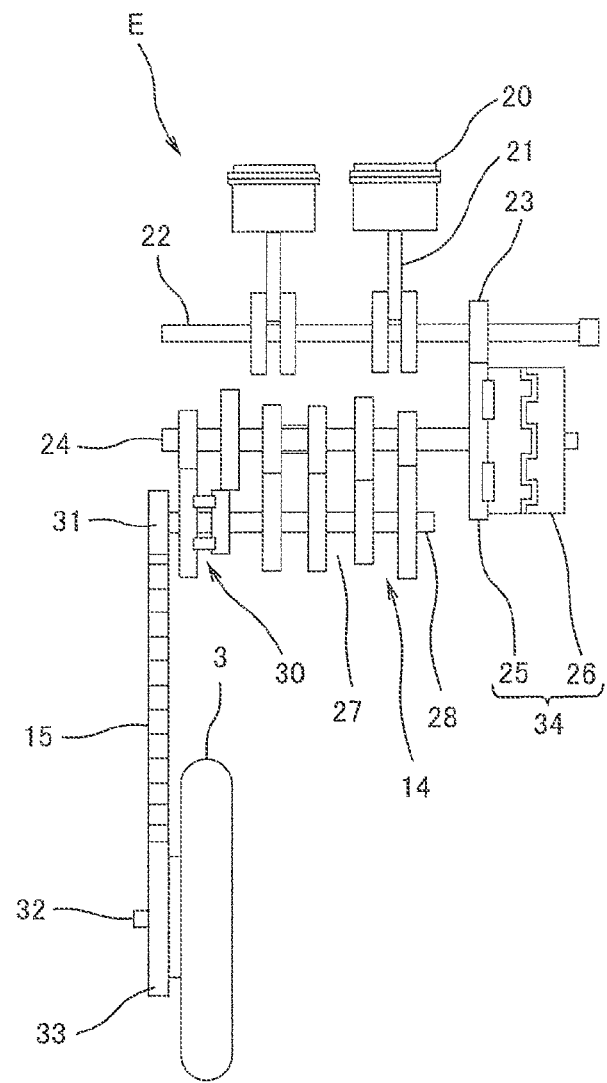
FIG. 2 is a schematic view showing a driving system of the motorcycle of FIG. 1.

FIG. 2 is a schematic view showing a driving system of the motorcycle of FIG. 1. As shown in FIG. 2, the engine E is provided with a crankshaft 22 coupled to connecting rods 21 of pistons 20 thereof, and a first clutch gear 23 is mounted on the end portion of the crankshaft 22. A second clutch gear 25 is rotatably externally fitted to an input shaft 24 of the transmission 14 and configured to mesh with the first clutch gear 23. A main clutch 26 is mounted on the end portion of the input shaft 24 and is opposite to the second clutch gear 25. A clutch 34 includes the main clutch 26 and the second clutch gear 25. With the main clutch 26 mounted on the end portion of the input shaft 24 being coupled to the second clutch gear 25, the input shaft 24 is rotatable in association with the crankshaft 22. An output shaft 28 is coupled to the input shaft 24 via a gear train 27 such that the rotational speed of the input shaft 24 is changed by the gear train 27 and transmitted to the output shaft 28. A known dog clutch 30 is mounted on the gear train 27 to change the gear. A drive sprocket 31 is mounted on the end portion of the output shaft 28. A driven sprocket 33 is mounted on an axle 32 of the rear wheel 3. A chain 15 is installed around the drive sprocket 31 and the driven sprocket 33.

Figure 3A:
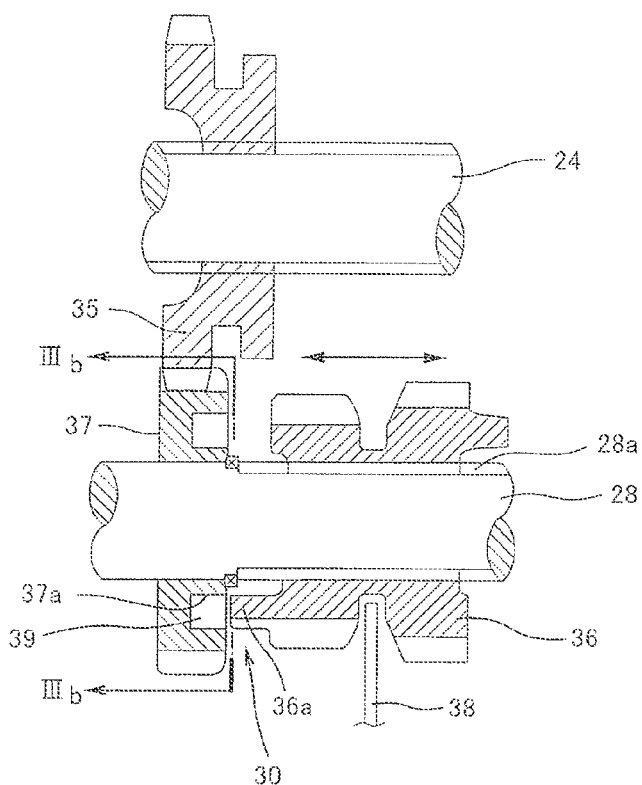
FIG. 3A is a cross-sectional view of a dog clutch in the driving system of FIG. 2
Figure 3B:
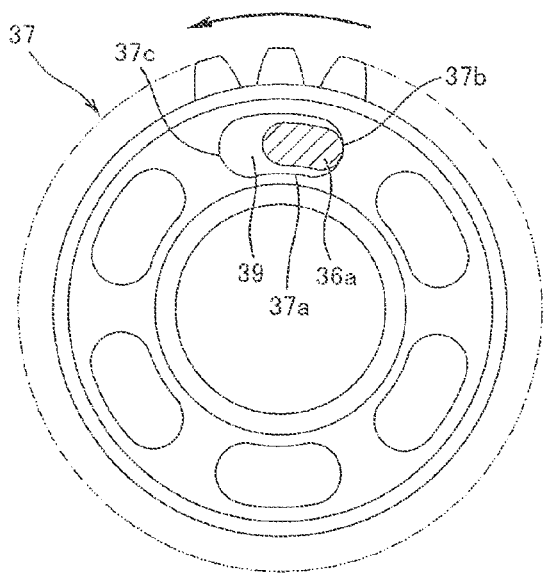
FIG. 3B is a cross-sectional view taken along line IIIb-IIIb of FIG. 3A.

FIG. 3A is a cross-sectional view of the dog clutch 30 in the driving system of FIG. 2 and FIG. 3B is a cross-sectional view taken along line IIIb-IIIb of FIG. 3A. Referring to FIGS. 3A and 3B, the dog clutch 30 includes a pair of gears 36 and 37 (driving power transmission members) which are arranged opposite to each other such that they are movable close to and away from each other in the axial direction of the output shaft 28. The output shaft 28 is provided on its outer peripheral surface with a spline 28a extending in a groove shape in the axial direction. The gear 36 is externally fitted to the output shaft 28 in mesh with the spline 28a. In other words, the gear 36 is slidable in the axial direction of the output shaft 28 and is rotatable integrally with the output shaft 28. The gear 37 is externally fitted to the output shaft 28 such that the gear 37 is rotatable relative to the output shaft 28.

The gear 36 has on its axial end surface an engagement protruding portion 36a protruding in the axial direction toward the gear 37. The gear 37 has an engagement recess portion 37a opposite to the engagement protruding portion 36a. A shift fork 38 allows the gear 36 to slide along the output shaft 28, thereby changing an axial distance between the gears 36 and 37. As a result, the gears 36 and 37 are placed into an engagement state or a disengagement state. A portion of the engagement protruding portion 36a and a portion of the engagement recess portion 37a which are engaged with each other are an example of engagement portions of the present invention.

The engagement protruding portion 36a and the engagement recess portion 37a are engaged with each other with a slack such that they are movable closer to and away from each other. To be specific, there is a space 39 in a state where the engagement protruding portion 36a and the engagement recess portion 37a are engaged with each other with a slack, and in this state they are rotatable relative to each other. In a case where a wall surface 37b of the engagement recess portion 37a, which wall surface is located at one side in a rotational direction of the output shaft 28, is in contact with the engagement protruding portion 36a, the gear 37 is rotated by the gear 35 of the input shaft 24, causing the gear 36 to rotate. In this way, a rotational driving power is transmitted from the gear 37 located at an upstream side on the driving power transmission path to the gear 36 located at a downstream side on the driving power transmission path. Hereinafter, the wall surface 37b of the engagement recess portion 37a which is located at one side in the rotational direction of the output shaft 28 is referred to as an acceleration wall surface 37b, while a wall surface 37c of the engagement recess portion 37a which is located at an opposite side in the rotational direction of the output shaft 28 is referred to as a deceleration wall surface 37c.

Figure 4:
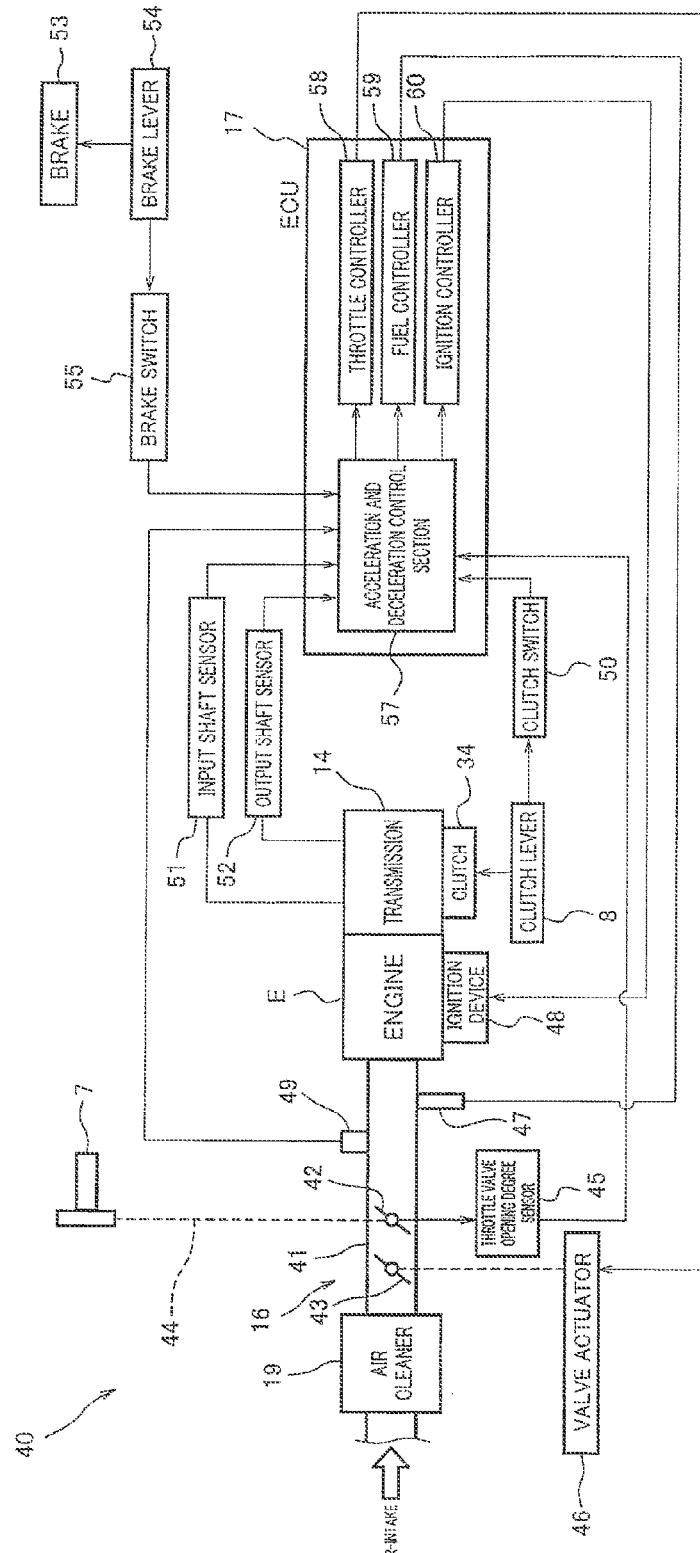
FIG. 4 is a block diagram showing an entire vehicle control system built into the motorcycle of FIG. 1.

FIG. 4 is a block diagram showing an entire vehicle control system 40 built into the motorcycle of FIG. 1. Referring to FIG. 4, the vehicle control system 40 includes the throttle device 16 provided between the air cleaner 19 and the engine E. The throttle device 16 includes an air-intake pipe 41, a main throttle valve 42 positioned downstream of the air-intake pipe 41, and a sub-throttle valve 43 positioned upstream of the air-intake pipe 41. The main throttle valve 42 is coupled to the throttle grip 7 via a throttle wire 44. The main throttle valve 42 is configured to be opened and closed in association with the driver's operation of the throttle grip 7. The main throttle valve 42 is attached with a throttle valve opening degree sensor 45 for detecting an opening degree of the main throttle valve 42. Since the main throttle valve 42 is mechanically operative in association with the throttle grip 7, the throttle valve opening degree sensor 45 detects the operation amount of the throttle grip 7.

The sub-throttle valve 43 is coupled to a valve actuator 46 including a motor controlled by the ECU 17, and is driven by the valve actuator 46 to be opened and closed. The throttle device 16 is provided with a plurality of injectors 47 configured to inject a fuel to inside a plurality of air-intake passages respectively corresponding to the plurality of cylinders in the engine E. The engine E is provided with a plurality of ignition devices 48 configured to ignite an air-fuel mixture within the plurality of cylinders, respectively. The air-intake pipe 41 is attached with an air-intake pressure sensor 49 configured to detect an air-intake pressure of air flowing through the air-intake passage.

The transmission 14 is coupled to the engine E. The transmission 14 is configured to change the speed of the driving power of the engine E and to transmit the resulting driving power to the rear wheel 3. The transmission 14 is attached with the clutch 34 configured to be engaged or disengaged to permit or inhibit transmission of the driving power to the rear wheel 3. The clutch 34 is configured to inhibit the driving power from being transmitted to the rear wheel 3 when the driver grips the clutch lever 8 and permit the driving power to be transmitted to the rear wheel 3 when the driver releases the clutch lever 8. The clutch lever 8 is attached with a clutch switch 50 (clutch disengagement determiner) configured to detect whether or not the clutch lever 8 has been gripped by the driver.

The transmission 14 is attached with an input shaft sensor 51 configured to detect a rotation number of the input shaft 24 (see FIG. 2) and an output shaft sensor 52 configured to detect a rotation number of the output shaft 28 (see FIG. 2). The motorcycle 1 includes a brake 53. The driver operates a brake lever 54 to actuate the brake 53 to brake the front wheel 2 and/or the rear wheel 3. The brake lever 54 is attached with a brake switch 55 (braking operation determiner) configured to detect whether or not the driver has operated the brake lever 54.

The throttle valve opening degree sensor 45, the clutch switch 50, the input shaft sensor 51, the output shaft sensor 52 and the brake switch 55 are coupled to the ECU 17. The ECU 17 includes an acceleration and deceleration control section 57, a throttle controller 58, a fuel controller 59, and an ignition controller 60. The acceleration and deceleration control section 57 is configured to perform calculation associated with driving power control of the engine E based on signals received from the sensors 45, 51, 52, and the switches 50 and 55. The throttle controller 58 is configured to drive the valve actuator 46 based on data calculated in the acceleration and deceleration control section 57 and control the opening degree of the sub-throttle valve 43. The fuel controller 59 is configured to control the injector 47 based on data calculated in the acceleration and deceleration control section 57. The ignition controller 60 is configured to control the ignition devices 48 based on data calculated in the acceleration and deceleration control section 57.

Figure 5:
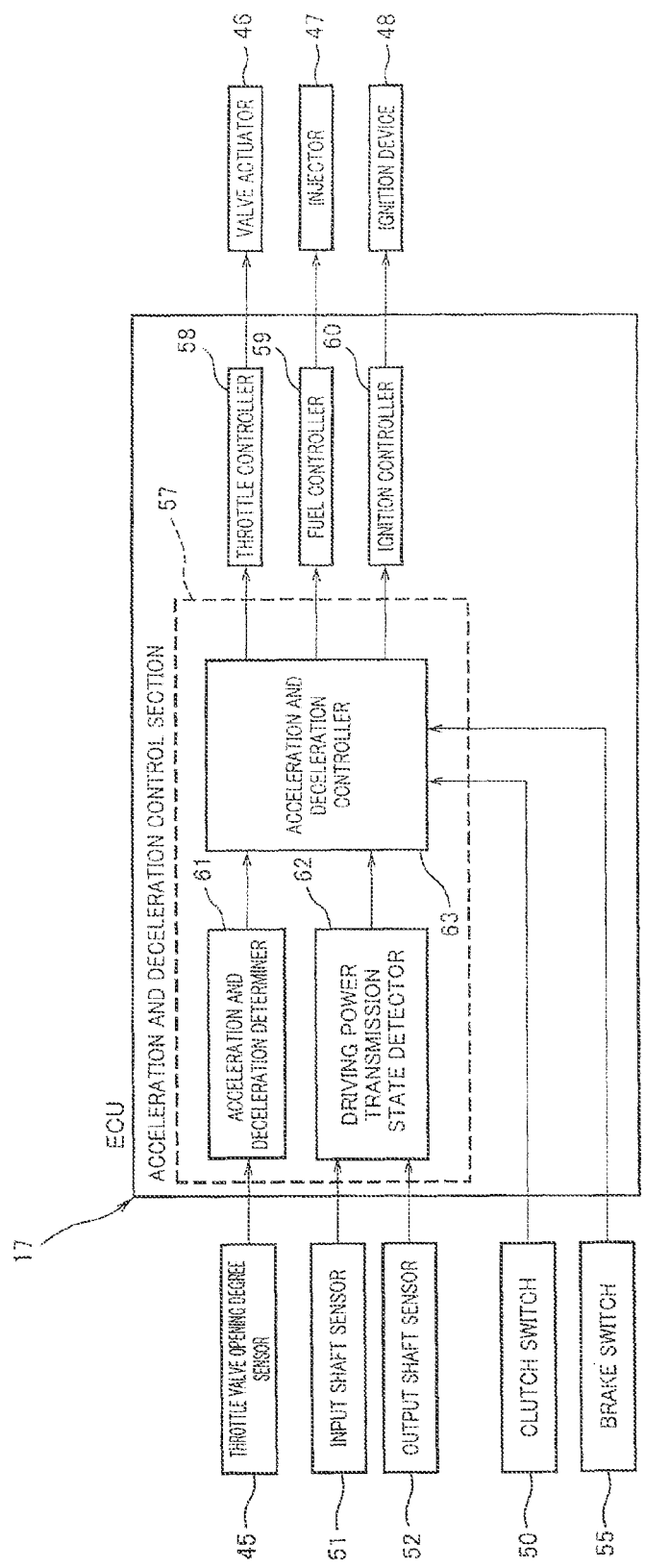
FIG. 5 is a block diagram showing major components in the vehicle control system of FIG. 4.

FIG. 5 is a block diagram showing major constituents in the vehicle control system 40 of FIG. 4. Referring to FIG. 5, the ECU 17 includes the acceleration and deceleration control section 57, the throttle controller 58, the fuel controller 59 and the ignition controller 60. The acceleration and deceleration control section 57 includes an acceleration and deceleration determiner 61, a driving power transmission state detector 62, and an acceleration and deceleration controller 63. The acceleration and deceleration determiner 61 is configured to determine whether or not the driver has performed a predetermined acceleration or deceleration operation, based on information from the throttle valve opening degree sensor 45. In this embodiment, the acceleration and deceleration determiner 61 is configured to determine whether or not the driver has performed a transient operation in which a change amount in an operation performed to transition the engine E from a decelerated state to an accelerated state or from the accelerated state to the decelerated state is larger than a predetermined value. To be specific, the acceleration and deceleration determiner 61 is configured to determine that the driver has performed the acceleration operation (transient operation) if a difference $\Delta TH$ of the throttle valve opening degree TH detected by the throttle valve opening degree sensor 45 is larger than a predetermined difference threshold $\Delta TH_1$ and the throttle valve opening degree TH is larger than a predetermined opening degree threshold $TH_1$. In this embodiment, the difference $\Delta TH$ may be, but is not limited to a difference (difference obtained by subtracting a former value from a latter value in a time series relation) between two values adjacent in the time series relation, among values detected by the throttle valve opening degree sensor 45 at a predetermined sampling period. For example, the difference $\Delta TH$ may be a difference between two values which are not adjacent in the time series relation, or may be a difference value obtained by a moving average process.

The driving power transmission state detector 62 is configured to detect as a driving power transmission state, a relative rotational speed V ($=V_i-V_o$) obtained by subtracting an output shaft rotation number $V_o$ detected by the output shaft sensor 52 from an input shaft rotation number $V_i$ detected by the input shaft sensor 51. In addition, the driving power transmission state detector 62 detects as a driving power transmission state, a relative rotational position X obtained by integrating the relative rotational speed V. It should be noted that the relative rotational position X may be regarded as zero when the engagement protruding portion 36a is positioned at the center in the rotational direction in the space 39 of the engagement recess portion 37a.

The acceleration and deceleration controller 63 is configured to execute acceleration or deceleration control for accelerating or decelerating the input shaft 24 or the output shaft 28 to reduce at least one of a contact speed and transmission torque of the engagement protruding portion 36a and the engagement recess portion 37a, based on the relative rotational speed V and the relative rotational position X which are detected by the driving power transmission state detector 62, if the acceleration and deceleration determiner 61 determines that the driver has performed the acceleration/deceleration operation. The acceleration and deceleration controller 63 is configured to permit the execution of the acceleration or deceleration control, when the acceleration and deceleration determiner 61 determines that the driver has performed the acceleration or deceleration operation and an absolute value of the relative rotational speed V detected by the driving power transmission state detector 62 is larger than a predetermined speed threshold $V_1$. The acceleration and deceleration controller 63 is configured to start the acceleration or deceleration control, at a time point when the absolute value of the relative rotational position X detected by the driving power transmission state detector 62 has exceeded a predetermined position threshold $X_1$. The acceleration and deceleration controller 63 is configured to terminate the acceleration or deceleration control if the acceleration and deceleration determiner 61 determines that the driver has not performed the acceleration or deceleration operation during the execution of the acceleration or deceleration control.

In this embodiment, the acceleration and deceleration controller 63 is configured to cause the ignition device 48 to retard or put forward an ignition timing of the engine E to control an engine driving power, thus executing acceleration or deceleration control for accelerating or decelerating the input shaft 24. The ignition timing control is suitably used as the acceleration or deceleration control of the present invention which occurs for a short time, because the engine driving power changes in a short time with high responsiveness to retarding or putting forward the ignition timing. The acceleration and deceleration controller 63 is configured to inhibit the acceleration or deceleration control if it is determined that the clutch 34 is disengaged, based on the information from the clutch switch 50. In addition, the acceleration and deceleration controller 63 is configured to inhibit the acceleration or deceleration control if the brake 53 is operating based on the information from the brake switch 55. Furthermore, the acceleration and deceleration controller 63 is configured to terminate the acceleration or deceleration control when a first predetermined time $T_1$ has lapsed from the start of the acceleration or deceleration control and inhibit the acceleration or deceleration control from being executed within a second predetermined time $T_2$ after the termination of the acceleration or deceleration control.

Figure 6:
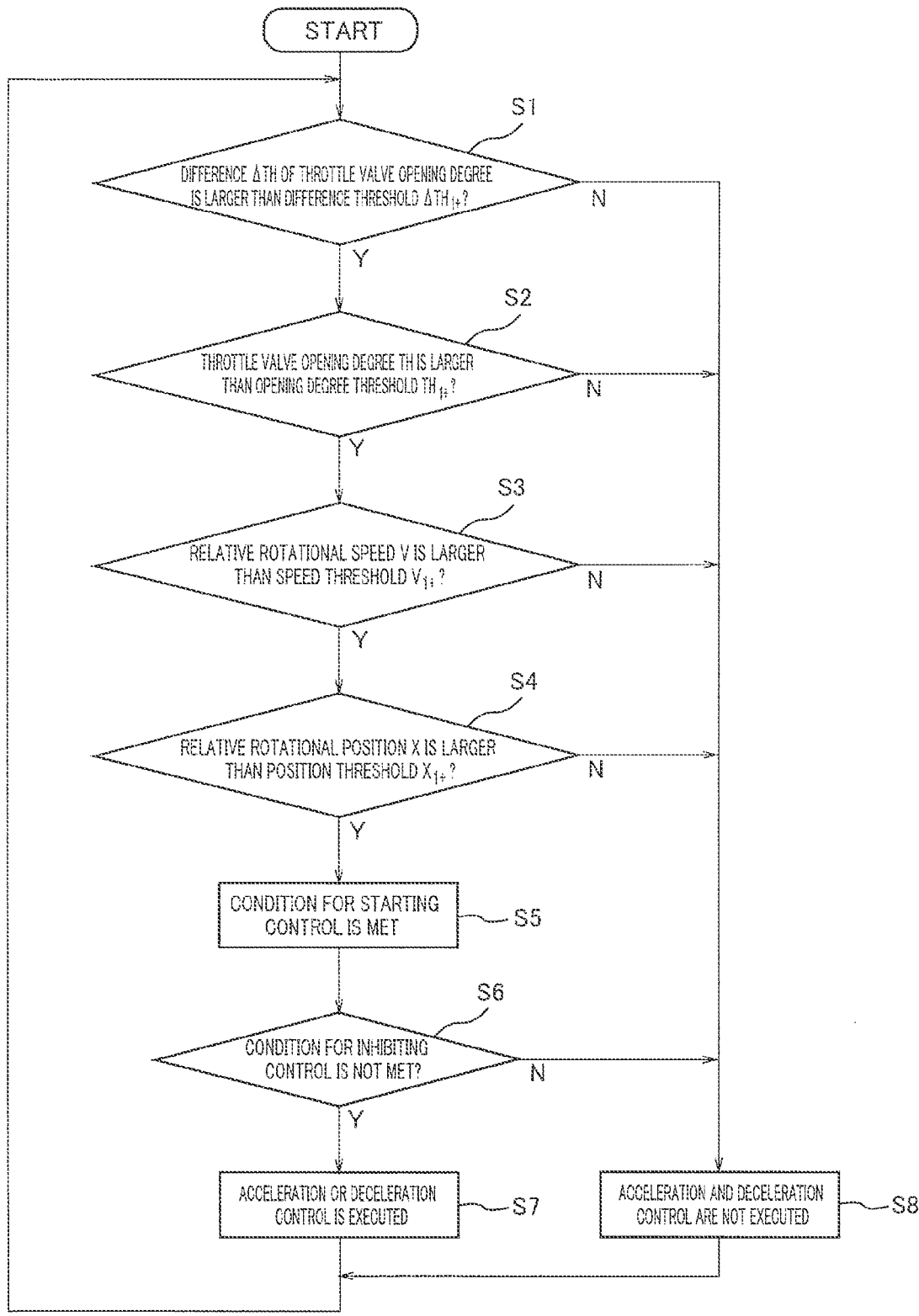
FIG. 6 is a flowchart showing a control process performed in the vehicle control system of FIG. 4 when decelerated driving transitions to accelerated driving.
Figure 7:
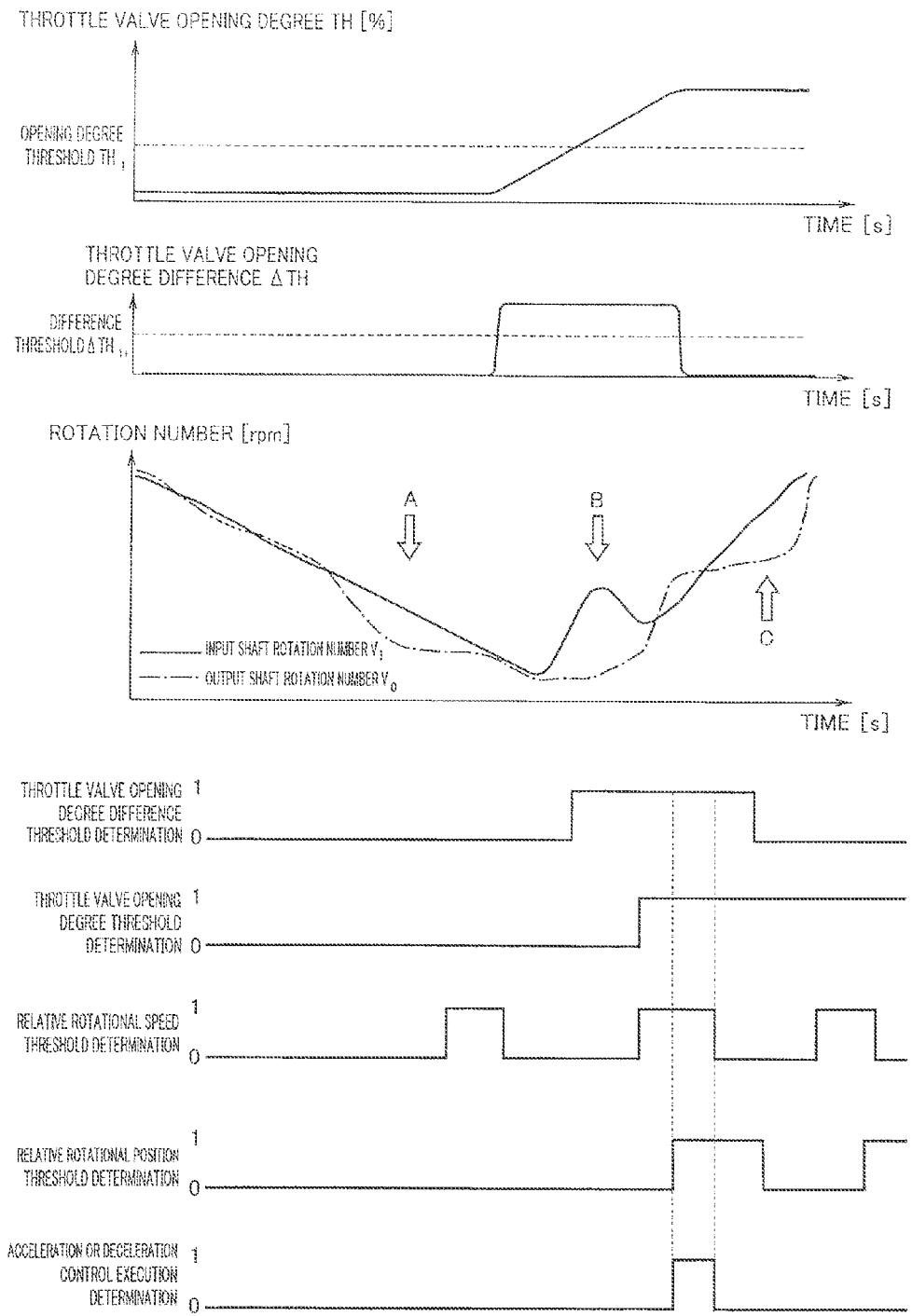
FIG. 7 is a timing chart showing the control process of FIG. 6.

Next, the control process executed by the vehicle control system 40 will be described. FIG. 6 is a flowchart showing a control process performed when decelerated driving transitions to accelerated driving in the vehicle control system 40 of FIG. 4. FIG. 7 is a timing chart showing the control process of FIG. 6. In a graph depicting rotation numbers in FIG. 7, a value obtained by multiplying the input shaft rotation number detected by the input shaft sensor 51 by a deceleration rate associated with the gears 36 and 37 (see FIG. 3), with which the driving power is transmitted from the input shaft 24 to the output shaft 28, is depicted as an input shaft rotation number, and an input shaft rotation number $V_i$ is depicted as being equal to an output shaft rotation number $V_o$, in a state where the engagement protruding portion 36a and the engagement recess portion 37a are not relatively angularly displaced from each other.

Referring to FIGS. 6 and 7, during driving of the motorcycle 1, initially, it is determined whether or not the difference $\Delta TH$ of the throttle valve opening degree is larger than a difference threshold $\Delta TH_{1+}$ which is a positive value (step S1). If No in step S1, it may be determined that the driver has not performed the acceleration operation, and therefore the acceleration and deceleration control are not executed (step S8). On the other hand, if Yes in step S1, it is determined whether or not the throttle valve opening degree TH is larger than an opening degree threshold $\Delta TH_{1+}$ (step S2). If No in step S2, it may be determined that the engine E is not highly accelerated, and therefore, the acceleration and deceleration control are not executed (step S8).

On the other hand, if Yes in step S2, it is determined that the driver has performed the acceleration operation (transient operation) for transitioning the engine E from the decelerated state to the accelerated state, and then it is determined whether or not the relative rotational speed V is larger than a speed threshold $V_{1+}$ which is a positive value (step S3). If No in step S3, it may be determined that the engine E is in an accelerated state where a great impact will not be generated at the engagement protruding portion 36*a* and the engagement recess portion 37*a*, and therefore, the acceleration and deceleration control are not executed (step S8). Thus, since the acceleration or deceleration control is executed when it is determined that the relative rotational speed V is high and a strong collision is likely to occur in the dog clutch 30. This makes it possible to prevent the acceleration or deceleration control from being frequently executed.

On the other hand, if Yes in step S3, it is determined whether or not the relative rotational position X is larger than a position threshold $X_{1+}$ which is a positive value (step S4). If No in step S4, it may be determined that the engagement protruding portion 36*a* of the dog clutch 30 has not moved from the deceleration wall surface 37*c* of the engagement recess portion 37*a* to a position sufficiently closer to the acceleration wall surface 37*b* of the engagement recess portion 37*a*, and therefore the acceleration and deceleration control are not executed yet (step S8). Since the acceleration and deceleration control are not executed before the relative rotational position V exceeds the position threshold $X_{1+}$, the acceleration or deceleration control can be started just before the time when a collision will occur in the dog clutch 30. As a result, it is possible to prevent the acceleration or deceleration control from continuing for a long time unnecessarily.

If Yes in step S4, it may be determined that the engagement protruding portion 36*a* of the dog clutch 30 has moved from the deceleration wall surface 37*c* to a position sufficiently closer to the acceleration wall surface 37*b*, it is determined that a condition used for starting the acceleration or deceleration control is met (step S5). However, it may be determined that the acceleration or deceleration control had better not be executed for various reasons. Therefore, in this embodiment, it is determined that a condition used for inhibiting the acceleration or deceleration control is not met (step S6).

One example of the condition used for inhibiting the acceleration or deceleration control is that the clutch 34 is disengaged. To be specific, when the clutch 34 is disengaged and the driving power is not transmitted from the engine E to the rear wheel 3, the acceleration and deceleration control are not executed (step S8). This makes it possible to prevent the acceleration or deceleration control from being executed unnecessarily, and to maintain a good acceleration capability when the clutch 34 returns from the disengaged state to the engaged state.

Another example of the condition used for inhibiting the acceleration or deceleration control is that the brake 53 is operating. To be specific, when the brake 53 is operating, the acceleration and deceleration control are not executed (step S8). This makes it possible to prevent the acceleration or deceleration control from being executed unnecessarily during a braking operation of the rear wheel 3, and to maintain a good acceleration capability when the braking operation of the brake 53 terminates.

Another example of the condition used for inhibiting the acceleration or deceleration control is that a time for which the acceleration or deceleration control continues exceeds a first predetermined time $T_1$. To be specific, if the time for which the acceleration or deceleration control continues exceeds the first predetermined time $T_1$, it is determined that it is necessary to suppress an influence on acceleration responsiveness, and the acceleration or deceleration control is terminated (step S8).

Another example of the condition used for inhibiting the acceleration or deceleration control is that a second predetermined time $T_2$ has not lapsed from a time point when the acceleration or deceleration control terminated previously. To be specific, if a second predetermined time $T_2$ has not lapsed from a time point when the acceleration or deceleration control terminated previously, it is determined that it is necessary to prevent the acceleration or deceleration control from repeating during an acceleration operation, and the acceleration and deceleration control are not executed (step S8).

If any of the above conditions used for inhibiting the acceleration or deceleration control is not met, the acceleration or deceleration control is executed (step S7). To be specific, FIG. 6 shows the control process in a case where decelerated driving transitions to accelerated driving, and the ignition timing is retarded to reduce the engine driving power in the acceleration or deceleration control. This makes it possible to reduce a relative rotational acceleration of the input shaft 24 and the output shaft 28.

In accordance with the above configuration, the engine driving power is controlled to be reduced during the acceleration operation in a case where the throttle valve opening degree TH is larger than the opening degree threshold $TH_1$ and the difference $\Delta TH$ of the throttle valve opening degree is larger than the difference threshold $\Delta TH_{1+}$ (see B in FIG. 7). This makes it possible to reduce a great impact which would be caused by the collision between the engagement protruding portion 36*a* and the engagement recess portion 37*a* of the dog clutch 30 when decelerated driving is transitioning to accelerated driving. As a result, the driver's driving feel is improved. In addition, it is possible to prevent occurrence of a slip which would be caused by an event that a driving power transmission member at the upstream side strongly presses against the driving power transmission member at the downstream side on the driving power transmission path in a direction to accelerate the engine E. As a result, a traction capability is improved.

During deceleration, the control for reducing the engine driving power is not executed if the relative rotational speed V larger than the threshold $V_{1+}$ is generated at the input shaft 24 and the output shaft 28 (see A in FIG. 7). In addition, the control for reducing the engine driving power is not executed even when a high relative rotational speed V is generated when a time lapses after the decelerated state transitioned to the accelerated state (see C in FIG. 7). This makes it possible to prevent the control for reducing the engine driving power from being frequently executed. As a result, drivability is improved.

Figure 8:
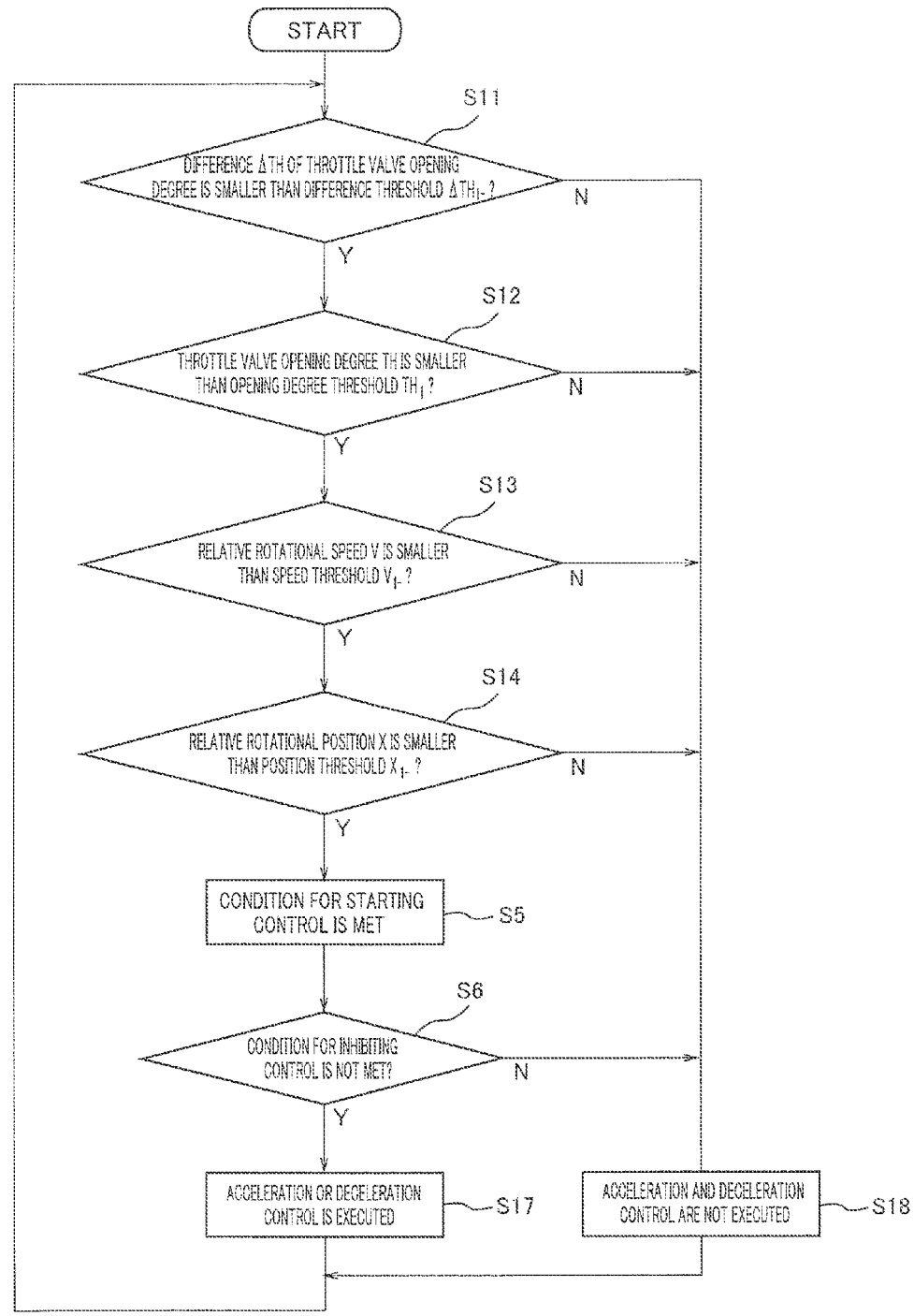
FIG. 8 is a flowchart showing a control process performed in the vehicle control system of FIG. 4 when accelerated driving transitions to decelerated driving.
Figure 9:
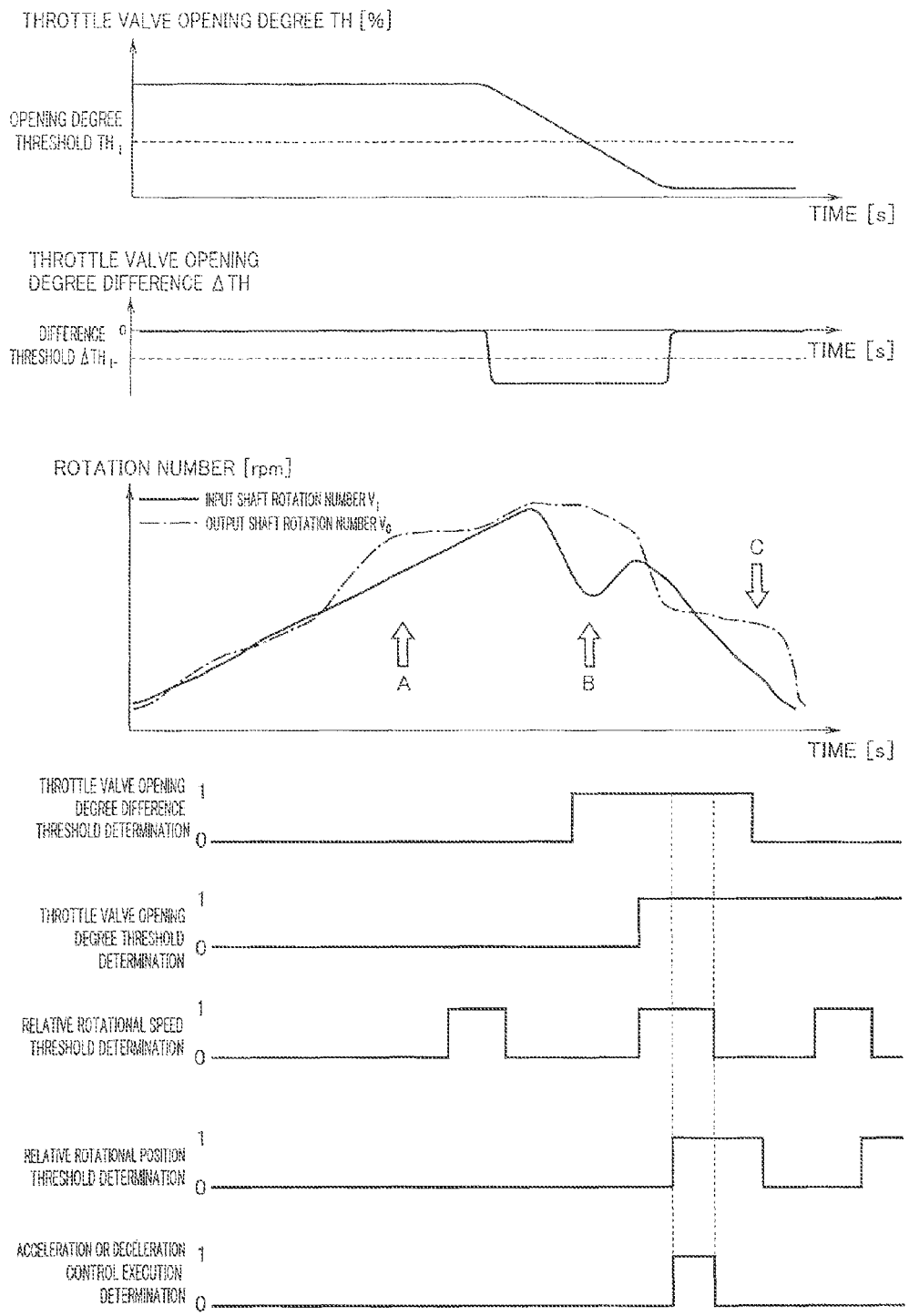
FIG. 9 is a timing chart showing the control process of FIG. 8.

FIG. 8 is a flowchart showing a control process performed when accelerated driving transitions to decelerated driving in the vehicle control system 40 of FIG. 4. FIG. 9 is a timing chart showing the control process of FIG. 8. Referring to FIGS. 8 and 9, during driving of the motorcycle 1, initially, it is determined whether or not the difference $\Delta TH$ of the throttle valve opening degree is smaller than a difference threshold $\Delta TH_{1-}$ which is a negative value (step S11). If No in step S11, it may be determined that the driver has not performed the deceleration operation, and therefore the acceleration and deceleration control are not executed (step S18). On the other hand, if Yes in step S11, it is determined whether or not the throttle valve opening degree TH is smaller than the opening degree threshold $\Delta TH_1$ (step S12). If No in step S12, it may be determined that the engine E is not highly decelerated, and therefore the acceleration and deceleration control are not executed (step S18).

On the other hand, if Yes in step S12, it is determined that the driver has performed the deceleration operation (transient operation) for transitioning the engine E from the accelerated state to the decelerated state, and then it is determined whether or not the relative rotational speed V is smaller than the speed threshold $V_{1-}$ which is a negative value (step S13).

If No in step S13, it may be determined that the engagement protruding portion 36a and the engagement recess portion 37a are in a decelerated state where a great impact will not be generated at these portions 36a and 37a, and therefore, the acceleration and deceleration control are not executed (step S18). Thus, since the acceleration or deceleration control is executed when it is determined that the absolute value of the relative rotational speed V is large and a strong collision will occur in the dog clutch 30. This makes it possible to prevent the acceleration or deceleration control from being frequently executed.

On the other hand, if Yes in step S13, it is determined whether or not the relative rotational position X is smaller than a position threshold $X_1$—which is a negative value (step S14). If No in step S14, it may be determined that the engagement protruding portion 36a of the dog clutch 30 has not moved from the acceleration wall surface 37b of the engagement recess portion 37a to a position sufficiently closer to the deceleration wall surface 37c of the engagement recess portion 37a, and therefore the acceleration and deceleration control are not executed (step S18). Since the acceleration and deceleration control are not executed before the relative rotational speed V becomes below the position threshold $X_1$—, the acceleration or deceleration control can be started just before the time when a collision will occur in the dog clutch 30. As a result, it is possible to prevent the acceleration or deceleration control from continuing for a long time unnecessarily.

On the other hand, if Yes in step S14, it may be determined that the engagement protruding portion 36a of the dog clutch 30 has moved from the acceleration wall surface 37b of the engagement recess portion 37a to a position sufficiently closer to the deceleration wall surface 37c of the engagement recess portion 37a, and it is determined that the condition used for starting the acceleration or deceleration control is met (step S5). Then, it is determined whether or not the above described condition used for inhibiting the acceleration or deceleration control is not met (step S6). If Yes in step S6, the acceleration or deceleration control is executed (step S17). To be specific, FIG. 8 shows the control process in a case where accelerated driving transitions to decelerated driving, and the ignition timing is put forward to increase the engine driving power in the acceleration or deceleration control. This makes it possible to reduce a relative rotational acceleration of the input shaft 24 and the output shaft 28.

In accordance with the above described configuration, the engine driving power is controlled to be increased during the deceleration operation in a case where the throttle valve opening degree TH is smaller than the opening degree threshold $TH_1$ and the difference ΔTH of the throttle valve opening degree is smaller than the difference threshold $ΔTH_{1-}$ (see B in FIG. 7). Therefore, a great impact which would be caused by the collision between the engagement protruding portion 36a and the engagement recess portion 37a of the dog clutch 30 can be mitigated when accelerated driving is transitioning to decelerated driving. As a result, the driver's driving feel is improved.

During acceleration, the control for increasing the engine driving power is not executed even if the relative rotational speed V smaller than a threshold $V_{1-}$ is generated at the input shaft 24 and the output shaft 28 (see A in FIG. 9). In addition, the control for increasing the engine driving power is not executed even if the absolute value of the relative rotational speed V increases after a time lapses from when accelerated driving transitioned to decelerated driving (see C in FIG. 9). This makes it possible to prevent the control for increasing the engine driving power from being frequently executed. As a result, drivability is improved.

(Embodiment 2)

Figure 10:
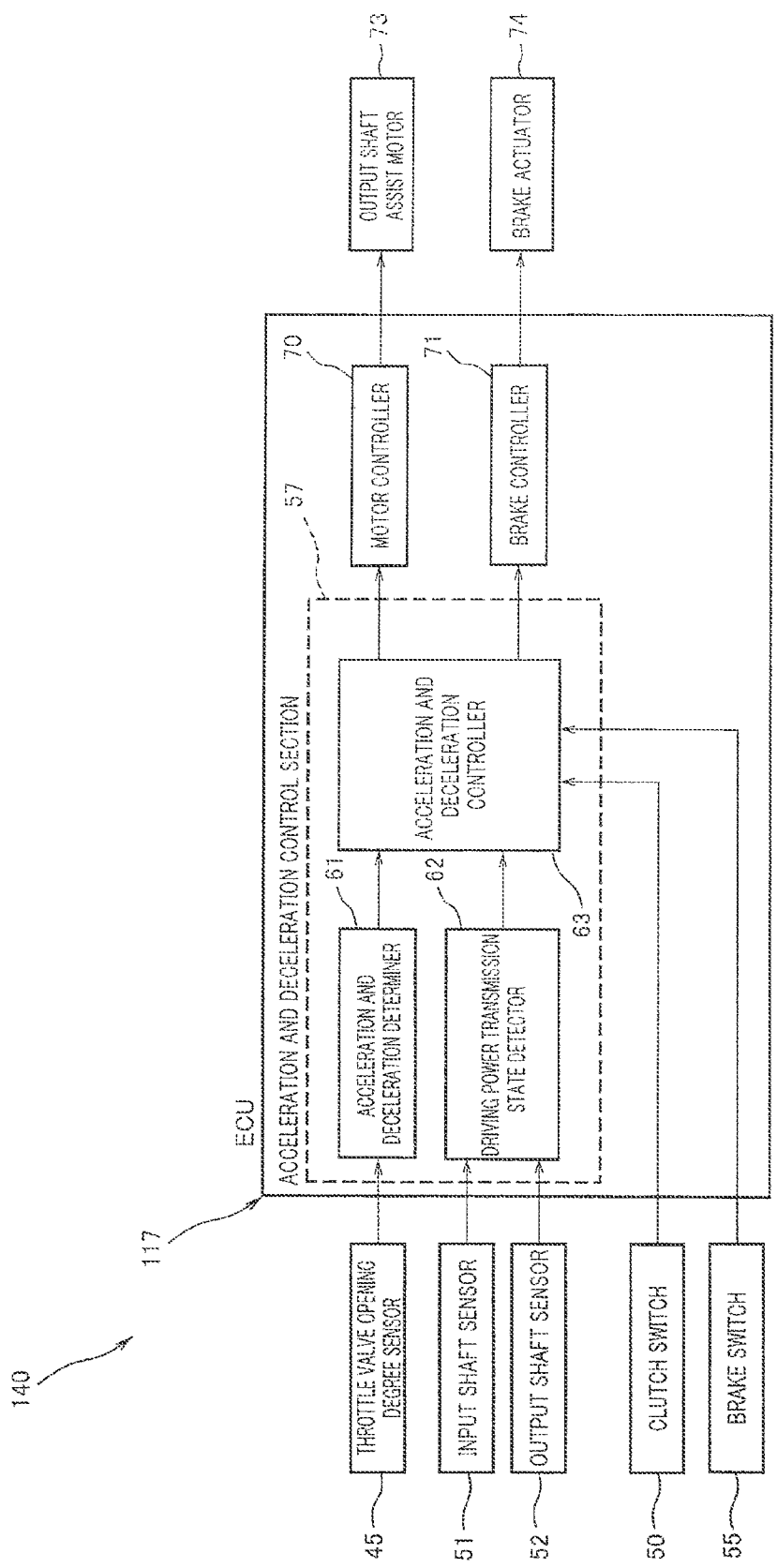
FIG. 10 is a block diagram showing major components in a vehicle control system according to Embodiment 2 of the present invention.

FIG. 10 is a block diagram showing major constituents in a vehicle control system 140 according to Embodiment 2 of the present invention. In Embodiment 2, the same constituents as those in Embodiment 1 are designated by the same reference numerals and will not be described repetitively. Referring to FIG. 10, the vehicle control system 140 of this embodiment includes an output shaft assist motor 73 configured to drive the output shaft 28 (see FIG. 2) and a brake actuator 74 configured to actuate a brake for the rear wheel 3 (see FIG. 1). An ECU 117 in the vehicle control system 140 includes a motor controller 70 configured to control the output shaft assist motor 73 and a brake controller 71 configured to control the brake actuator 74. The acceleration and deceleration controller 63 in the ECU 117 performs the acceleration or deceleration control in such a manner that the acceleration and deceleration controller 63 drives the output assist motor 73 or the brake actuator 74 to accelerate or decelerate the output shaft 28.

In accordance with the above configuration, in step S7 of FIG. 6, the control for accelerating the output shaft 28 by driving the output shaft assist motor 73 is performed instead of the above described ignition timing retard control, thereby reducing the relative rotational acceleration of the input shaft 24 and the output shaft 28 when the decelerated state is transitioning to the accelerated state. This makes it possible to reduce a great impact which would be caused by the collision between the engagement protruding portion 36a and the engagement recess portion 37a of the dog clutch 30 when decelerated driving is transitioning to accelerated driving. As a result, the driver's driving feel is improved.

In step S17 of FIG. 8, the control for decelerating the output shaft 28 by driving the brake actuator 74 is performed instead of the control for putting forward the ignition timing to reduce the relative rotational acceleration of the input shaft 24 and the output shaft 28 when the accelerated state is transitioning to the decelerated state. This makes it possible to reduce a great impact which would be caused by the collision between the engagement protruding portion 36a and the engagement recess portion 37a of the dog clutch 30 when accelerated driving is transitioning to decelerated driving. As a result, the driver's driving feel is improved.

(Embodiment 3)

Figure 11:
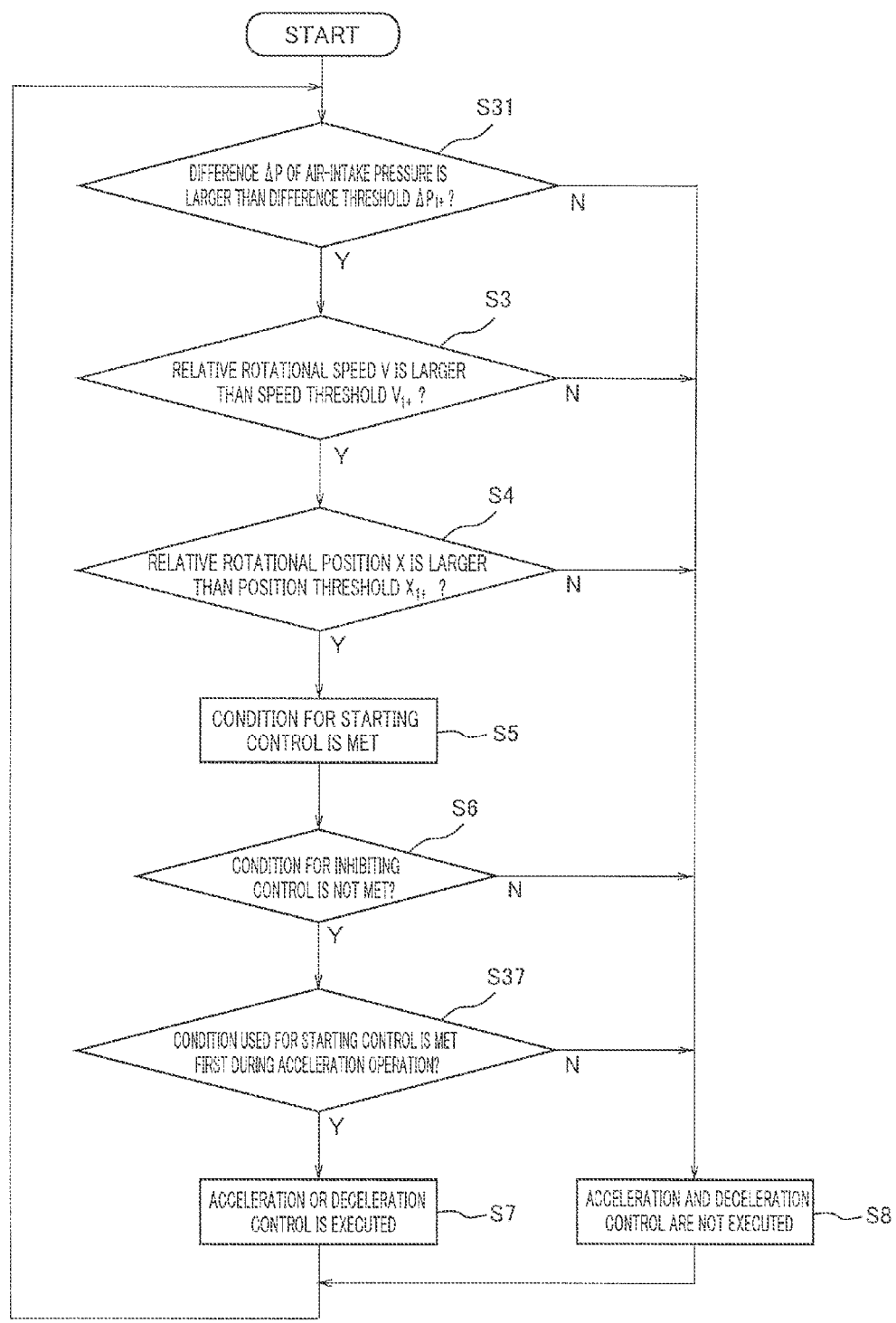
FIG. 11 is a flowchart showing a control process performed when decelerated driving transitions to accelerated driving in a vehicle control system according to Embodiment 3 of the present invention.
Figure 12:
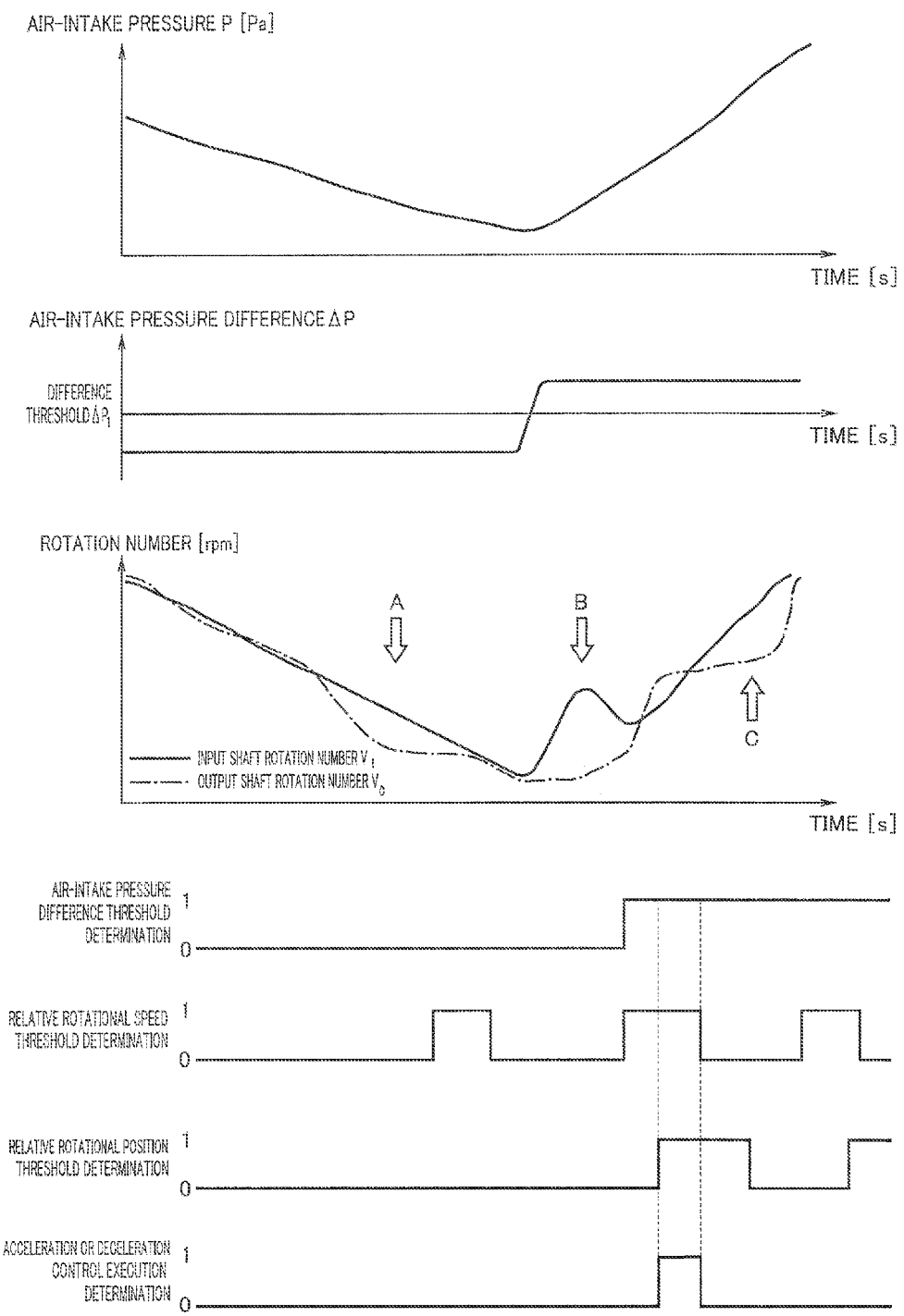
FIG. 12 is a timing chart showing the control process of FIG. 11.

FIG. 11 is a flowchart showing a control process performed when decelerated driving transitions to accelerated driving in a vehicle control system according to Embodiment 3 of the present invention. FIG. 12 is a timing chart showing the control process of FIG. 11. In Embodiment 3, the same constituents as those in Embodiment 1 are designated by the same reference numerals and will not be described repetitively. In this embodiment, it is determined whether or not to perform the acceleration or deceleration control based on an air-intake pressure instead of the throttle valve opening degree. Referring to FIGS. 11 and 12, during driving of the motorcycle 1, it is determined whether or not a difference ΔP of the air-intake pressure detected by an air-intake pressure sensor 49 is larger than a difference threshold $ΔP_{1+}$ which is a positive value (step S31). In this case, the air-intake pressure difference ΔP may be a difference between average values of the air-intake pressures in the respective cylinders of the engine E or a difference of bottom peak values of air-intake pressures in a specified cylinder.

If No in step S31, it may be determined that the driver has not performed the acceleration operation, and the acceleration and deceleration control are not executed (step S8). On the other hand, if Yes in step S31, the process moves to step S3. Step S3 to Step S6 are identical to those in Embodiment 1 and will not be described repetitively. If Yes in step S6, it is determined whether or not the condition used for starting the acceleration or deceleration control is met first during the acceleration operation (Yes continues in step S1) (step S37).

If No in step S37, i.e., if the condition used for starting the acceleration or deceleration control is not met after the condition is met once and thereafter the condition is met again, during the acceleration operation, it is determined that a time has lapsed after decelerated driving has transitioned to accelerated driving (C in FIG. 12), and therefore the acceleration and deceleration control are not executed (step S8). On the other hand, if Yes in step S37, it is determined that the driver has performed the transient operation for transitioning the engine E from the decelerated state to the accelerated state (B in step S12), and therefore the acceleration and deceleration control is executed (step S7).

The above illustrated embodiments are merely exemplary and may be altered suitably as described below. For example, the present invention may be applied to any other vehicles including driving power transmission members which are engaged with each other with a slack on a driving power transmission path through which a driving power is transmitted from a driving power source to a drive wheel, as well as the above described motorcycle. Although the vehicle includes the engine E as the driving power source in the above embodiments, the present invention may be applied to an electric vehicle including a motor instead of the engine, or a hybrid vehicle including a motor and an engine. In that case, the motor may be controlled to be decelerated in the control for decelerating the input shaft 24.

Although the acceleration and deceleration determiner 61 determines whether or not to perform the acceleration or deceleration control based on the information from the throttle valve opening degree sensor 45, it may determine whether or not to perform the acceleration or deceleration control based on information detected by a grip opening degree sensor configured to detect the opening degree of the throttle grip 7 which is an input member directly operated by the driver.

Although the control for retarding or putting forward the ignition timing is exemplarily described as the control for accelerating or decelerating the input shaft 24 by reducing the engine driving power, other methods may be used. For example, the engine driving power may be reduced by omitting ignition in a combustion stroke of a part of the plurality of cylinders in the engine E, by reducing the amount of a fuel injected by the injector 47 or setting it to zero, or by reducing the air intake amount controlled using the throttle valve.

Although in the above embodiments, the input shaft 24 of the transmission 14 is illustrated as the input shaft positioned upstream of the dog clutch 30 on the driving power transmission path, the crankshaft 22 may be used as the input shaft positioned upstream of the dog clutch 30 on the driving power transmission path. In that case, as the input shaft sensor, a crankshaft sensor may be used.

Although in the above embodiments, the clutch switch 50 is used as the device for determining whether or not the clutch 34 is disengaged, it may be determined that the clutch 34 is disengaged when the input shaft rotation number $V_i$ detected by the input shaft sensor 51 is not less than a predetermined threshold $V_{i1}$, the output shaft rotation number $V_o$ detected by the output shaft sensor 52 is not more than a predetermined threshold $V_{o1}$ and the predetermined threshold $V_{i1}$ is larger than the predetermined threshold $V_{o1}$ by a predetermined value or larger.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A vehicle control system in a vehicle including driving power transmission members which are engaged with each other with a slack on a driving power transmission path through which a driving power is transmitted from a driving power source to a drive wheel, the vehicle control system comprising:
    an acceleration and deceleration determiner configured to determine whether or not a driver has performed a predetermined acceleration or deceleration operation;
    a driving power transmission state detector configured to detect a value of at least one of a relative rotational position and a relative rotational speed of an input shaft and an output shaft provided on the driving power transmission path, the input shaft being positioned upstream of an engagement portion of the driving power transmission members which are engaged with each other with a slack on the driving power transmission path, and the output shaft being positioned downstream of the engagement portion on the driving power transmission path;
    an acceleration and deceleration controller configured to execute acceleration or deceleration control for accelerating or decelerating the input shaft or the output shaft to reduce at least one of a contact speed and a transmission torque of the driving power transmission members based on the value detected by the driving power transmission state detector, if the acceleration and deceleration determiner determines that the driver has performed the acceleration or deceleration operation, wherein
    the acceleration and deceleration determiner is configured to determine that a transient operation in which a change amount in an operation performed by the driver to transition the driving power source from a decelerated state to an accelerated state or from the accelerated state to the decelerated state is larger than a predetermined value is the predetermined acceleration or deceleration operation; and the vehicle control system further comprising:
    a throttle valve opening degree sensor configured to detect an opening degree of a throttle valve for controlling an amount of air supplied to an engine which is the driving power source;
    wherein the acceleration and deceleration determiner is configured to determine that the driver has performed the transient operation for transitioning the driving power source from the decelerated state to the accelerated state if a difference of the throttle valve opening degree detected by the throttle valve opening degree sensor is larger than a difference threshold which is a predetermined positive value and the throttle valve opening degree is larger than a predetermined opening degree threshold.

2. A vehicle control system in a vehicle including driving power transmission members which are engaged with each other with a slack on a driving power transmission path through which a driving power is transmitted from a driving power source to a drive wheel, the vehicle control system comprising:

an acceleration and deceleration determiner configured to determine whether or not a driver has performed a predetermined acceleration or deceleration operation;

a driving power transmission state detector configured to detect a value of at least one of a relative rotational position and a relative rotational speed of an input shaft and an output shaft provided on the driving power transmission path, the input shaft being positioned upstream of an engagement portion of the driving power transmission members which are engaged with each other with a slack on the driving power transmission path, and the output shaft being positioned downstream of the engagement portion on the driving power transmission path;

an acceleration and deceleration controller configured to execute acceleration or deceleration control for accelerating or decelerating the input shaft or the output shaft to reduce at least one of a contact speed and a transmission torque of the driving power transmission members based on the value detected by the driving power transmission state detector, if the acceleration and deceleration determiner determines that the driver has performed the acceleration or deceleration operation, wherein the acceleration and deceleration determiner is configured to determine that a transient operation in which a change amount in an operation performed by the driver to transition the driving power source from a decelerated state to an accelerated state or from the accelerated state to the decelerated state is larger than a predetermined value is the predetermined acceleration or deceleration operation; vehicle control system further comprising:

a throttle valve opening degree sensor configured to detect an opening degree of a throttle valve for controlling an amount of air supplied to an engine which is the driving power source;

wherein the acceleration and deceleration determiner is configured to determine that the driver has performed the transient operation for transitioning the driving power source from the accelerated state to the decelerated state if a difference of the throttle valve opening degree detected by the throttle valve opening degree sensor is smaller than a difference threshold which is a predetermined negative value and the throttle valve opening degree is smaller than a predetermined opening degree threshold.

3. The vehicle control system according to claim 1A vehicle control system in a vehicle including driving power transmission members which are engaged with each other with a slack on a driving power transmission path through which a driving power is transmitted from a driving power source to a drive wheel, the vehicle control system comprising:

an acceleration and deceleration determiner configured to determine whether or not a driver has performed a predetermined acceleration or deceleration operation;

a driving power transmission state detector configured to detect a value of at least one of a relative rotational position and a relative rotational speed of an input shaft and an output shaft provided on the driving power transmission path, the input shaft being positioned upstream of an engagement portion of the driving power transmission members which are engaged with each other with a slack on the driving power transmission path, and the output shaft being positioned downstream of the engagement portion on the driving power transmission path; and an acceleration and deceleration controller configured to execute acceleration or deceleration control for accelerating or decelerating the input shaft or the output shaft to reduce at least one of a contact speed and a transmission torque of the driving power transmission members based on the value detected by the driving power transmission state detector, if the acceleration and deceleration determiner determines that the driver has performed the acceleration or deceleration operation, wherein the acceleration and deceleration controller is configured to permit execution of the acceleration or deceleration control if an absolute value of the relative rotational speed detected by the driving power transmission state detector is larger than a predetermined speed threshold.

4. A vehicle control system in a vehicle including driving power transmission members which are engaged with each other with a slack on a driving power transmission path through which a driving power is transmitted from a driving power source to a drive wheel, the vehicle control system comprising:

an acceleration and deceleration determiner configured to determine whether or not a driver has performed a predetermined acceleration or deceleration operation;

a driving power transmission state detector configured to detect a value of at least one of a relative rotational position and a relative rotational speed of an input shaft and an output shaft provided on the driving power transmission path, the input shaft being positioned upstream of an engagement portion of the driving power transmission members which are engaged with each other with a slack on the driving power transmission path, and the output shaft being positioned downstream of the engagement portion on the driving power transmission path; and an acceleration and deceleration controller configured to execute acceleration or deceleration control for accelerating or decelerating the input shaft or the output shaft to reduce at least one of a contact speed and a transmission torque of the driving power transmission members based on the value detected by the driving power transmission state detector, if the acceleration and deceleration determiner determines that the driver has performed the acceleration or deceleration operation.

wherein the acceleration and deceleration controller is configured to start the acceleration or deceleration control at a time when an absolute value of the relative rotational position detected by the driving power transmission state detector exceeds a predetermined position threshold, if the acceleration and deceleration determiner determines that the driver has performed the predetermined acceleration or deceleration operation.

5. A vehicle control system in a vehicle including driving power transmission members which are engaged with each other with a slack on a driving power transmission path through which a driving power is transmitted from a driving power source to a drive wheel, the vehicle control system comprising:

an acceleration and deceleration determiner configured to determine whether or not a driver has performed a predetermined acceleration or deceleration operation;

a driving power transmission state detector configured to detect a value of at least one of a relative rotational position and a relative rotational speed of an input shaft and an output shaft provided on the driving power transmission path, the input shaft being positioned upstream of an engagement portion of the driving power transmission members which are engaged with each other with a slack on the driving power transmission path, and the output shaft being positioned downstream of the engagement portion on the driving power transmission path; and an acceleration and deceleration controller configured to execute acceleration or deceleration control for accelerating or decelerating the input shaft or the output shaft to reduce at least one of a contact speed and a transmission torque of the driving power transmission members based on the value detected by the driving power transmission state detector, if the acceleration and deceleration determiner determines that the driver has performed the acceleration or deceleration operation, wherein the acceleration and deceleration controller is configured to terminate the acceleration or deceleration control if the acceleration and deceleration determiner determines that the driver has not performed the predetermined acceleration or deceleration operation during the acceleration or deceleration control, the vehicle control system further comprising:

a throttle valve opening degree sensor configured to detect an opening degree of a throttle valve for controlling an amount of air supplied to an engine which is the driving power source;

wherein the acceleration and deceleration controller is configured to terminate the acceleration or deceleration control if an absolute value of a difference of the throttle valve opening degree detected by the throttle valve opening degree sensor is not more than a predetermined difference threshold during the acceleration or deceleration control.

6. A vehicle control system in a vehicle including driving power transmission members which are engaged with each other with a slack on a driving power transmission path through which a driving power is transmitted from a driving power source to a drive wheel, the vehicle control system comprising:

an acceleration and deceleration determiner configured to determine whether or not a driver has performed a predetermined acceleration or deceleration operation;

a driving power transmission state detector configured to detect a value of at least one of a relative rotational position and a relative rotational speed of an input shaft and an output shaft provided on the driving power transmission path, the input shaft being positioned upstream of an engagement portion of the driving power transmission members which are engaged with each other with a slack on the driving power transmission path, and the output shaft being positioned downstream of the engagement portion on the driving power transmission path; and an acceleration and deceleration controller configured to execute acceleration or deceleration control for accelerating or decelerating the input shaft or the output shaft to reduce at least one of a contact speed and a transmission torque of the driving power transmission members based on the value detected by the driving power transmission state detector, if the acceleration and deceleration determiner determines that the driver has performed the acceleration or deceleration operation, wherein the acceleration and deceleration controller is configured to terminate the acceleration or deceleration control if the acceleration and deceleration determiner determines that the driver has not performed the predetermined acceleration or deceleration operation during the acceleration or deceleration control, the vehicle control system further comprising:

an air-intake pressure sensor configured to detect an air-intake pressure of an engine which is the driving power source;

wherein the acceleration and deceleration controller is configured to terminate the acceleration or deceleration control if an absolute value of a difference of the air-intake pressure detected by the air-intake pressure sensor is not more than a predetermined difference threshold during the acceleration or deceleration control.

7. A vehicle control system in a vehicle including driving power transmission members which are engaged with each other with a slack on a driving power transmission path through which a driving power is transmitted from a driving power source to a drive wheel, the vehicle control system comprising:

an acceleration and deceleration determiner configured to determine whether or not a driver has performed a predetermined acceleration or deceleration operation;

a driving power transmission state detector configured to detect a value of at least one of a relative rotational position and a relative rotational speed of an input shaft and an output shaft provided on the driving power transmission path, the input shaft being positioned upstream of an engagement portion of the driving power transmission members which are engaged with each other with a slack on the driving power transmission path, and the output shaft being positioned downstream of the engagement portion on the driving power transmission path; and an acceleration and deceleration controller configured to execute acceleration or deceleration control for accelerating or decelerating the input shaft or the output shaft to reduce at least one of a contact speed and a transmission torque of the driving power transmission members based on the value detected by the driving power transmission state detector, if the acceleration and deceleration determiner determines that the driver has performed the acceleration or deceleration operation, wherein the acceleration and deceleration controller is configured to terminate the acceleration or deceleration control when a first predetermined time has lapsed from start of the acceleration or deceleration control.

8. A vehicle control system in a vehicle including driving power transmission members which are engaged with each other with a slack on a driving power transmission path through which a driving power is transmitted from a driving power source to a drive wheel, the vehicle control system comprising:

an acceleration and deceleration determiner configured to determine whether or not a driver has performed a predetermined acceleration or deceleration operation;

a driving power transmission state detector configured to detect a value of at least one of a relative rotational position and a relative rotational speed of an input shaft and an output shaft provided on the driving power transmission path, the input shaft being positioned upstream of an engagement portion of the driving power transmission members which are engaged with each other with a slack on the driving power transmission path, and the output shaft being positioned downstream of the engagement portion on the driving power transmission path; and an acceleration and deceleration controller configured to execute acceleration or deceleration control for accelerating or decelerating the input shaft or the output shaft to reduce at least one of a contact speed and a transmission torque of the driving power transmission members based on the value detected by the driving power transmission state detector, if the acceleration and deceleration determiner determines that the driver has performed the acceleration or deceleration operation, wherein the acceleration and deceleration controller is configured to inhibit the acceleration or deceleration control from being executed within a second predetermined time after termination of the acceleration or deceleration control.

9. A vehicle control system in a vehicle including driving power transmission members which are engaged with each other with a slack on a driving power transmission path through which a driving power is transmitted from a driving power source to a drive wheel, the vehicle control system comprising:

an acceleration and deceleration determiner configured to determine whether or not a driver has performed a predetermined acceleration or deceleration operation;

a driving power transmission state detector configured to detect a value of at least one of a relative rotational position and a relative rotational speed of an input shaft and an output shaft provided on the driving power transmission path, the input shaft being positioned upstream of an engagement portion of the driving power transmission members which are engaged with each other with a slack on the driving power transmission path, and the output shaft being positioned downstream of the engagement portion on the driving power transmission path;

an acceleration and deceleration controller configured to execute acceleration or deceleration control for accelerating or decelerating the input shaft or the output shaft to reduce at least one of a contact speed and a transmission torque of the driving power transmission members based on the value detected by the driving power transmission state detector, if the acceleration and deceleration determiner determines that the driver has performed the acceleration or deceleration operation; and a clutch disengagement determiner configured to determine whether or not a clutch provided on the driving power transmission path is disengaged;

wherein the acceleration and deceleration controller is configured to inhibit the acceleration or deceleration control from being executed if the clutch disengagement determiner determines that the clutch is disengaged.

10. A vehicle control system in a vehicle including driving power transmission members which are engaged with each other with a slack on a driving power transmission path through which a driving power is transmitted from a driving power source to a drive wheel, the vehicle control system comprising:

an acceleration and deceleration determiner configured to determine whether or not a driver has performed a predetermined acceleration or deceleration operation;

a driving power transmission state detector configured to detect a value of at least one of a relative rotational position and a relative rotational speed of an input shaft and an output shaft provided on the driving power transmission path, the input shaft being positioned upstream of an engagement portion of the driving power transmission members which are engaged with each other with a slack on the driving power transmission path, and the output shaft being positioned downstream of the engagement portion on the driving power transmission path;

an acceleration and deceleration controller configured to execute acceleration or deceleration control for accelerating or decelerating the input shaft or the output shaft to reduce at least one of a contact speed and a transmission torque of the driving power transmission members based on the value detected by the driving power transmission state detector, if the acceleration and deceleration determiner determines that the driver has performed the acceleration or deceleration operation; and a braking operation determiner configured to determine whether or not a brake of the drive wheel is operating;

wherein the acceleration and deceleration controller is configured to inhibit the acceleration or deceleration control from being executed if the braking operation determiner determines that the brake is operating.

* * * * *

UNITED STATES PATENT AND TRADEMARK OFFICE
CERTIFICATE OF CORRECTION

PATENT NO. : 8,510,021 B2
APPLICATION NO. : 12/954023
DATED : August 13, 2013
INVENTOR(S) : Kenji Takenaka et al.

Page 1 of 1

It is certified that error appears in the above-identified patent and that said Letters Patent is hereby corrected as shown below:

In the Claims:

At Column 17, line 47, delete "The vehicle control system according to Claim 1".

At Column 18, line 44, delete "." and insert --,--.

Signed and Sealed this
Twelfth Day of November, 2013

Teresa Stanek Rea
*Deputy Director of the United States Patent and Trademark Office*